US008827576B2

(12) United States Patent
Johnson

(10) Patent No.: US 8,827,576 B2
(45) Date of Patent: *Sep. 9, 2014

(54) PANORAMIC CAMERA MOUNT

(76) Inventor: Joseph Johnson, San Luis Obispo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/569,055

(22) Filed: Aug. 7, 2012

(65) Prior Publication Data

US 2012/0301131 A1    Nov. 29, 2012

Related U.S. Application Data

(63) Continuation of application No. 13/293,648, filed on Nov. 10, 2011, now Pat. No. 8,262,299, which is a continuation of application No. 12/655,419, filed on Dec. 29, 2009, now Pat. No. 8,075,203, which is a continuation of application No. 11/327,265, filed on Jan. 5, 2006, now Pat. No. 7,658,556.

(60) Provisional application No. 60/642,045, filed on Jan. 7, 2005.

(51) Int. Cl.

| G03B 17/00 | (2006.01) |
| F16M 11/04 | (2006.01) |
| G03B 17/56 | (2006.01) |
| F16M 11/02 | (2006.01) |
| G03B 37/00 | (2006.01) |
| F16M 11/16 | (2006.01) |
| F16M 11/08 | (2006.01) |

(52) U.S. Cl.
CPC ............ *G03B 17/561* (2013.01); *F16M 11/04* (2013.01); *G03B 17/56* (2013.01); *F16M 11/041* (2013.01); *F16M 11/02* (2013.01); *G03B 37/00* (2013.01); *F16M 2200/027* (2013.01); *F16M 11/16* (2013.01); *F16M 11/08* (2013.01)

USPC ............................................. 396/428

(58) Field of Classification Search
USPC ............................................. 396/428
See application file for complete search history.

(56) References Cited

U.S. PATENT DOCUMENTS

| 596,207 A | 12/1897 | Hart |
| 916,286 A | 3/1909 | Evans |

(Continued)

FOREIGN PATENT DOCUMENTS

JP    2000-97395 A    4/2000

OTHER PUBLICATIONS

300N Manfrotto, at least one year prior to filing date, 1 pg.

(Continued)

*Primary Examiner* — Rodney Fuller
(74) *Attorney, Agent, or Firm* — Chernoff Vilhauer McClung & Stenzel, LLP

(57) ABSTRACT

A panoramic device includes a base member and a clamp member rotatably interconnected within a single plane of rotation with the base that includes a first rotatable knob to selectively inhibit the rotation of the clamp member with respect to the base. The upper surface includes a central region that is at a different elevation than another portion of the upper surface. The clamp includes a pair of opposed surfaces suitable to detachably secure a camera thereto. The one of the opposed surfaces is maintained in a fixed relationship with respect to the clamp member. The other one of the opposed surfaces is in a movable relationship with respect to the clamp member using a second rotatable knob. The first knob and the second knob are rotatably connected with respect to one another.

44 Claims, 12 Drawing Sheets

(56) References Cited

U.S. PATENT DOCUMENTS

| | | | |
|---|---|---|---|
| 1,282,177 A | 10/1918 | Blankenhorn | |
| 1,539,277 A | 5/1925 | Schenck | |
| 1,677,889 A | 7/1928 | Gairing | |
| 2,180,214 A | 11/1939 | Rapp | |
| 2,782,700 A | 2/1957 | Ianuzzi | |
| 2,791,950 A | 5/1957 | Oppenheimer | |
| 2,824,504 A | 2/1958 | Bethmann | |
| 2,840,334 A | 6/1958 | Gauthen | |
| 3,030,135 A | 4/1962 | Polanski | |
| 3,183,810 A | 5/1965 | Campbell et al. | |
| 3,356,325 A | 12/1967 | Schnase | |
| 3,650,195 A | 3/1972 | Jones | |
| 3,677,509 A | 7/1972 | O'Connor | |
| 3,737,130 A | 6/1973 | Shiraishi | |
| 3,855,602 A | 12/1974 | Hoos | |
| 4,091,402 A | 5/1978 | Siegel | |
| 4,187,021 A | 2/1980 | Balser | |
| 4,255,036 A | 3/1981 | Pincetich | |
| 4,272,177 A | 6/1981 | Ottenheimer | |
| 4,291,967 A | 9/1981 | Jackson, Jr. | |
| 4,768,049 A | 8/1988 | Barrett et al. | |
| 4,772,081 A | 9/1988 | Borgos et al. | |
| 4,886,230 A | 12/1989 | Jones et al. | |
| 4,929,973 A | 5/1990 | Nakatani | |
| 5,072,907 A | 12/1991 | Vogt | |
| 5,137,238 A | 8/1992 | Hutten | |
| 5,249,766 A | 10/1993 | Vogt | |
| D357,031 S * | 4/1995 | Hanke | D16/245 |
| 5,601,265 A | 2/1997 | Lopez | |
| 5,782,572 A | 7/1998 | Thiem | |
| 5,870,641 A | 2/1999 | Chrosziel | |
| 6,042,277 A | 3/2000 | Errington | |
| 6,196,504 B1 * | 3/2001 | Lemke | 248/187.1 |
| 6,234,690 B1 | 5/2001 | Lemieux | |
| 6,252,727 B1 | 6/2001 | Vogt | |
| 6,352,228 B1 | 3/2002 | Buerklin | |
| 6,354,544 B1 | 3/2002 | Muzila | |
| 6,435,738 B1 * | 8/2002 | Vogt | 396/419 |
| 6,461,259 B1 | 10/2002 | Li | |
| D467,605 S * | 12/2002 | Dordick | D16/242 |
| 6,581,892 B2 | 6/2003 | Carnevali | |
| 6,641,323 B2 | 11/2003 | Ronsheim | |
| D483,789 S * | 12/2003 | Dordick | D16/245 |
| 6,663,299 B1 | 12/2003 | Shupak | |
| 6,685,148 B2 | 2/2004 | Zadok | |
| 6,701,081 B1 | 3/2004 | Dwyer et al. | |
| 6,773,172 B1 | 8/2004 | Johnson et al. | |
| 6,991,384 B1 | 1/2006 | Davis | |
| 7,000,282 B2 | 2/2006 | Cox et al. | |
| 7,077,582 B2 | 7/2006 | Johnson | |
| 7,184,658 B2 | 2/2007 | Squillace | |
| 7,409,153 B2 * | 8/2008 | Ramadan | 396/329 |
| 7,457,535 B2 | 11/2008 | Johnson | |
| D596,658 S * | 7/2009 | Dordick | D16/242 |
| 7,658,556 B2 * | 2/2010 | Johnson | 396/428 |
| 8,075,203 B2 * | 12/2011 | Johnson | 396/428 |
| 8,262,299 B2 * | 9/2012 | Johnson | 396/428 |
| 2002/0179786 A1 | 12/2002 | Zheng | |
| 2005/0217324 A1 | 10/2005 | Miao | |

OTHER PUBLICATIONS

303 Manfrotto, at least one year prior to filing date, 1 pg.
303 Plus Manfrotto, at least one year prior to filing date, 1 pg.
303 SPH Manfrotto, at least one year prior to filing date, 1 pg.
338 Manfrotto, at least one year prior to filing date, 1 pg.
ARCA-SWISS, Monoball B, Oct. 1998, 1 pg.

* cited by examiner

PANORAMIC CAMERA MOUNT

CROSS-REFERENCE TO RELATED APPLICATIONS

This application is a continuation of U.S. patent application Ser. No. 13/293,648, filed Nov. 10, 2011, which is a continuation of U.S. patent application Ser. No. 12/655,419, filed Dec. 29, 2009, now U.S. Pat. No. 8,075,203 B2, which is a continuation of U.S. patent application Ser. No. 11/327,265, filed Jan. 5, 2006, now U.S. Pat. No. 7,658,556, which claims the benefit of U.S. Provisional App. No. 60/642,045, filed Jan. 7, 2005.

BACKGROUND OF THE INVENTION

The present invention generally relates to a camera mount, and in particular to a camera mount suitable for taking panoramic pictures.

Aberrations and distortions occur at the edge regions of a wide-angle view of a landscape. Taking and assembling together multiple images across the view results in a panoramic that is larger than is generally available using a single shot picture. Properly aligning film strips or digital images to produce a panoramic picture can be a difficult task. This task is especially difficult if the camera is not properly centered on a rotatable mount.

A panoramic camera is disclosed in Gasso et al., U.S. Pat. No. 2,111,854, that includes an adjustable lens to vary the focal length of the lenses in mathematical proportions to the varying distances of objects in the panoramic view.

Campbell et al., U.S. Pat. No. 3,183,810 disclose a motor-driven panoramic camera having automatic means for stopping the angular sweep of the camera and adjustments for changing the angle of sweep and for making the sweep symmetrical or unsymmetrical.

Blankenhorn, U.S. Pat. No. 1,282,177, discloses a system for making panoramic pictures comprising marking the film as the film is advanced and the camera rotated.

A camera mount useful for taking stereoscopic or panoramic pictures is disclosed by Ianuzzi in U.S. Pat. No. 2,782,700.

DETAILED DESCRIPTION OF PREFERRED EMBODIMENT

For a vertical column of overlapping images, a panning clamp should have a vertical orientation. One technique to achieve this orientation is to mount a panning clamp on top of a tripod head or otherwise directly to a tripod. To more effectively use the panning clamp, the camera and lens should be mounted so that the camera and lens pivot around the nodal point or the entrance pupil. In most cases, this involves the camera and lens being backed off from the typical tripod mounting point so that the entrance pupil is located at the pivot point.

Figure 1:
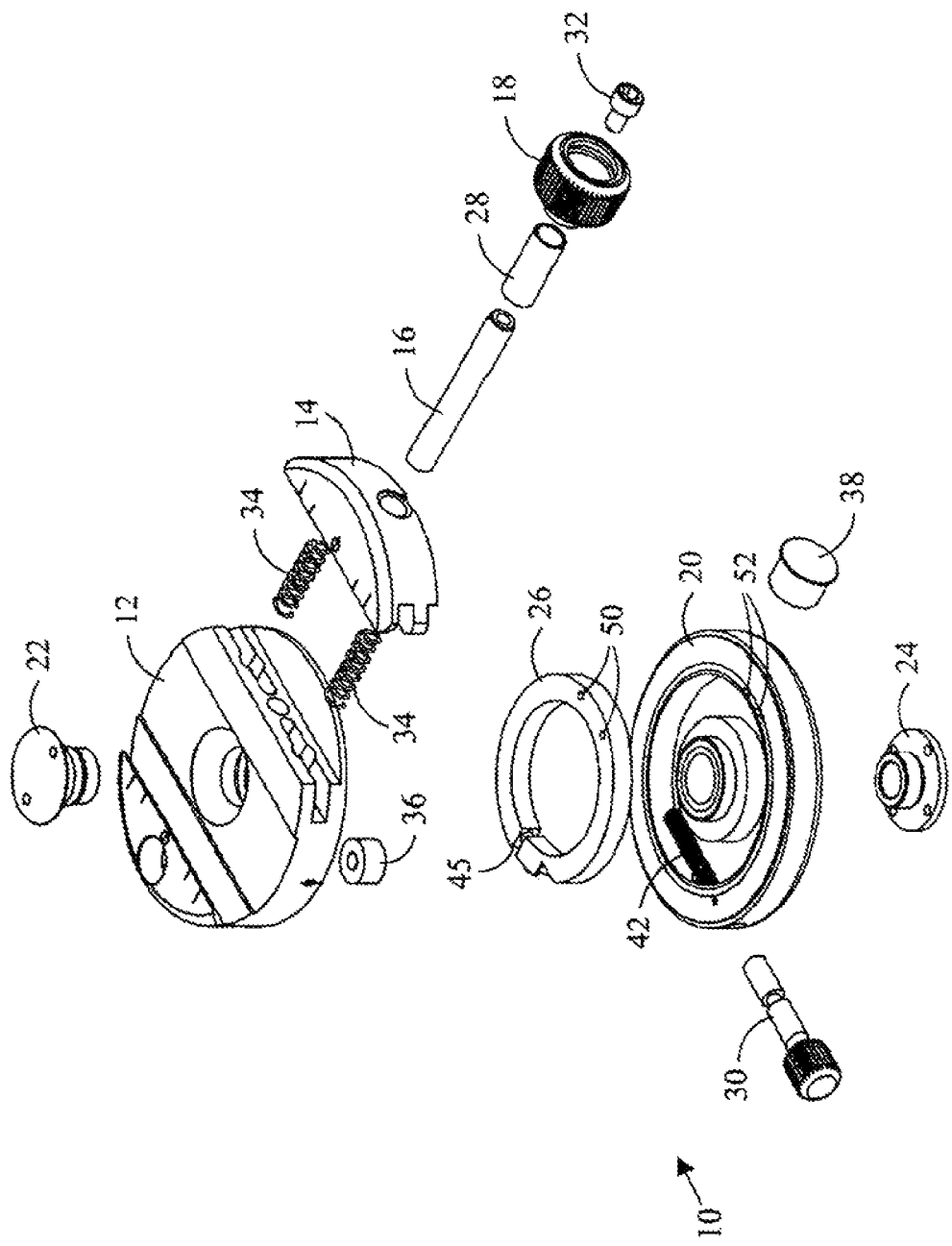
FIG. 1 illustrates an assembly drawing of a panning clamp.

Referring to FIG. 1, a panning clamp 10 includes a clamp body 12 and a clamp jaw 14. The clamp jaw 14 is engaged with the body 12 by a pair of clamp springs 34. The springs 34 exert an outwardly directed force on the clamp jaw 14. The clamp jaw 14 is secured in place by the combination of a clamp screw 16, a clamp sleeve 28 surrounding the clamp screw 16, a clamp knob 18, and a screw 32. The clamp sleeve 28 sets the spacing for the clamp knob 18 and presses against the exterior of the clamp jaw 14. As the clamp knob 18 is released the clamp jaw 14 will be pressed outwardly thereby opening the clamp and keeping the clamp jaw 14 in tension to maintain it in a suitable position. As the clamp knob 18 is tightened, the clamp jaw 14 will be pressed inwardly thereby closing the clamp and securing any plate or other imaging equipment (e.g., camera, video camera, etc.) therein. A plug 22 may be secured over the opening in the body 12. A plastic cover 38 may be secured over the end of the clamp knob 18.

In order to ensure that the top surface of the panning clamp 10 is level, a bubble level 36 may be included. The top of the bubble level 36 is preferably approximately flush with the upper surface of the panning clamp 10. With the panning clamp 10 attached to a support, such as a ball head, the panning clamp 10 is brought into a level position so that upon rotation an accurate set of panoramic images may be obtained.

A panning base 20 includes a recess therein into which supports a cinching ring 26. The cinching ring 26 may be secured to the panning base 20 by securing pins through a pair of openings 50 in the cinching ring 26 and a matching pair of openings 52 in the panning base 20. A cinching knob 30 attached to a stud 42 is engaged with a threaded gap 45 in the cinching ring 26. A retaining member 24 is secured to the plug 22 in such a manner to maintain the panning base and the body 12 together with the desired ability to freely rotate.

Figure 2:
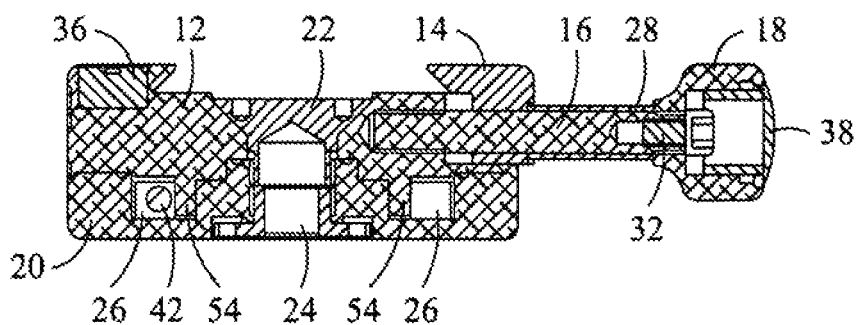
FIG. 2 illustrates a cut-away view along line C-C of FIG. 3.
Figure 3:
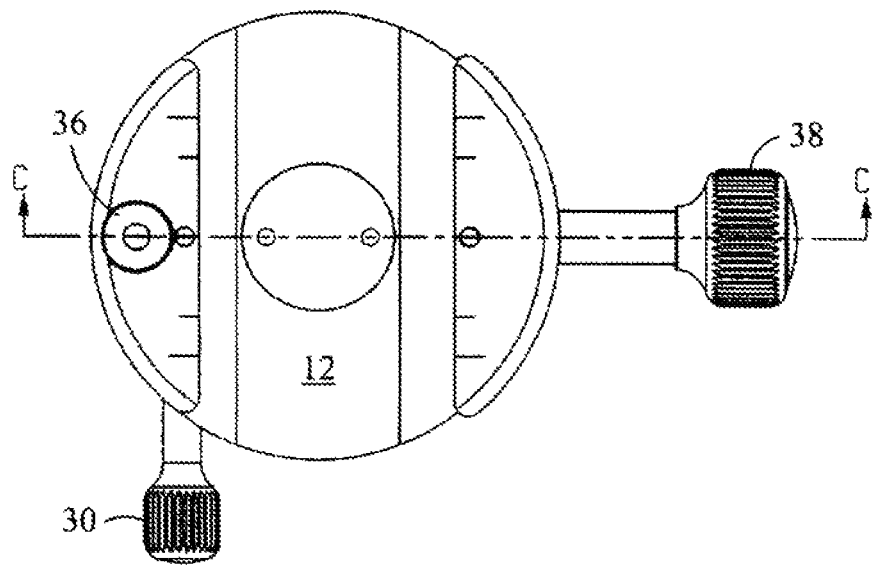
FIG. 3 illustrates a top view of an assembled panning clamp of FIG.

Referring also to FIG. 2, which is a section along line C-C of FIG. 3, the cinching ring 26 surrounds a lower portion 54 of the clamp body 14. When the user desires to permit free rotational motion of the clamp body 12 with respect to the panning base 20, the cinching knob 30 is released, which releases the cinching ring 26. When the user desires to inhibit free rotational motion of the clamp body 12 with respect to the panning base 20, the cinching knob 30 is tightened, which decreases the diameter of the cinching ring 26. The decreased diameter of the cinching ring 26 results in significant frictional engagement between the cinching ring 26 and the lower portion 54 of the clamp body 12. The cinching ring 26 and the lower portion 54 preferably have mating surfaces along 50% or more, 75% or more, or 90% or more of the circumference of the surfaces. This results in selective rotational movement of the panning clamp 10.

Figure 4:
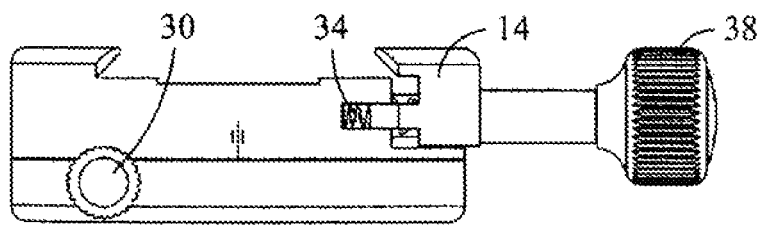
FIG. 4 illustrates a side view of an assembled panning clamp of FIG. 1.
Figure 5:
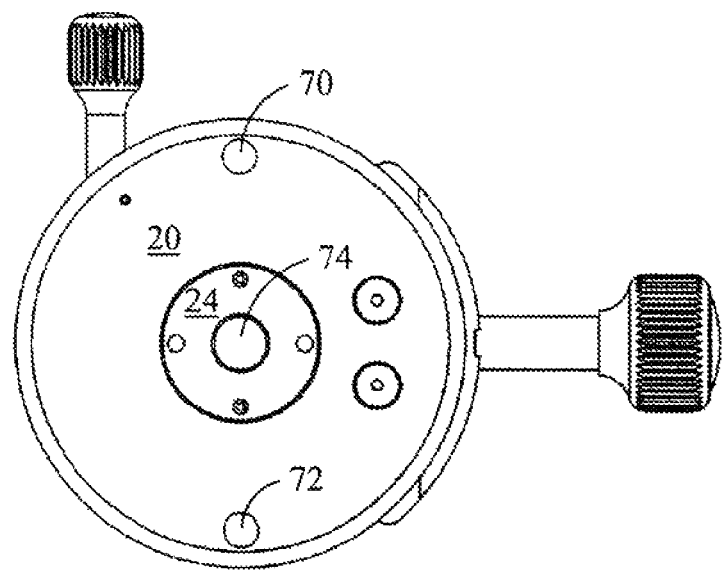
FIG. 5 illustrates a bottom view of an assembled panning clamp of FIG. 1.
Figure 6:
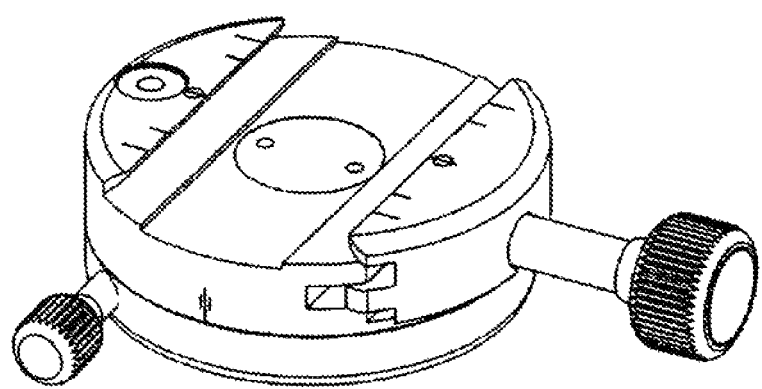
FIG. 6 illustrates a pictorial view of an assembled panning clamp of FIG. 1.

FIG. 4 illustrates a side view with the clamp jaw 14 extended by the springs 34. With the clamp jaw 14 retracted, a plate or other member may be readily inserted within the panning clamp 10. With the clamp jaw 14 engaged, the plate or other member is securely held in place within the panning clamp 10. FIG. 5 illustrates the base of the panning clamp 10 with a pair of threaded openings 70 and 72 suitable for securing the panning clamp 10 to a plate or other member. Also, the central opening 74 may be used to secure the panning clamp 10 to a plate or other member. FIG. 6 illustrates a pictorial view of an assembled panning clamp 10.

The panning clamp 10 itself preferably only includes the ability for rotational movement, and not the ability to rotate, in order to ensure accurate panning. It is to be understood that the rotational movement preferably has some reasonable amount of friction at all times so that the panning clamp 10 does not rotate without some reasonable pressure being exerted. In this manner, even without the panning function being locked the panning clamp 10 will not tend to rotate without the user's turning of the clamp body 14. In addition, the panning clamp 10 should have a height that is less than 50% of the diameter of the panning clamp 10.

Figure 7:
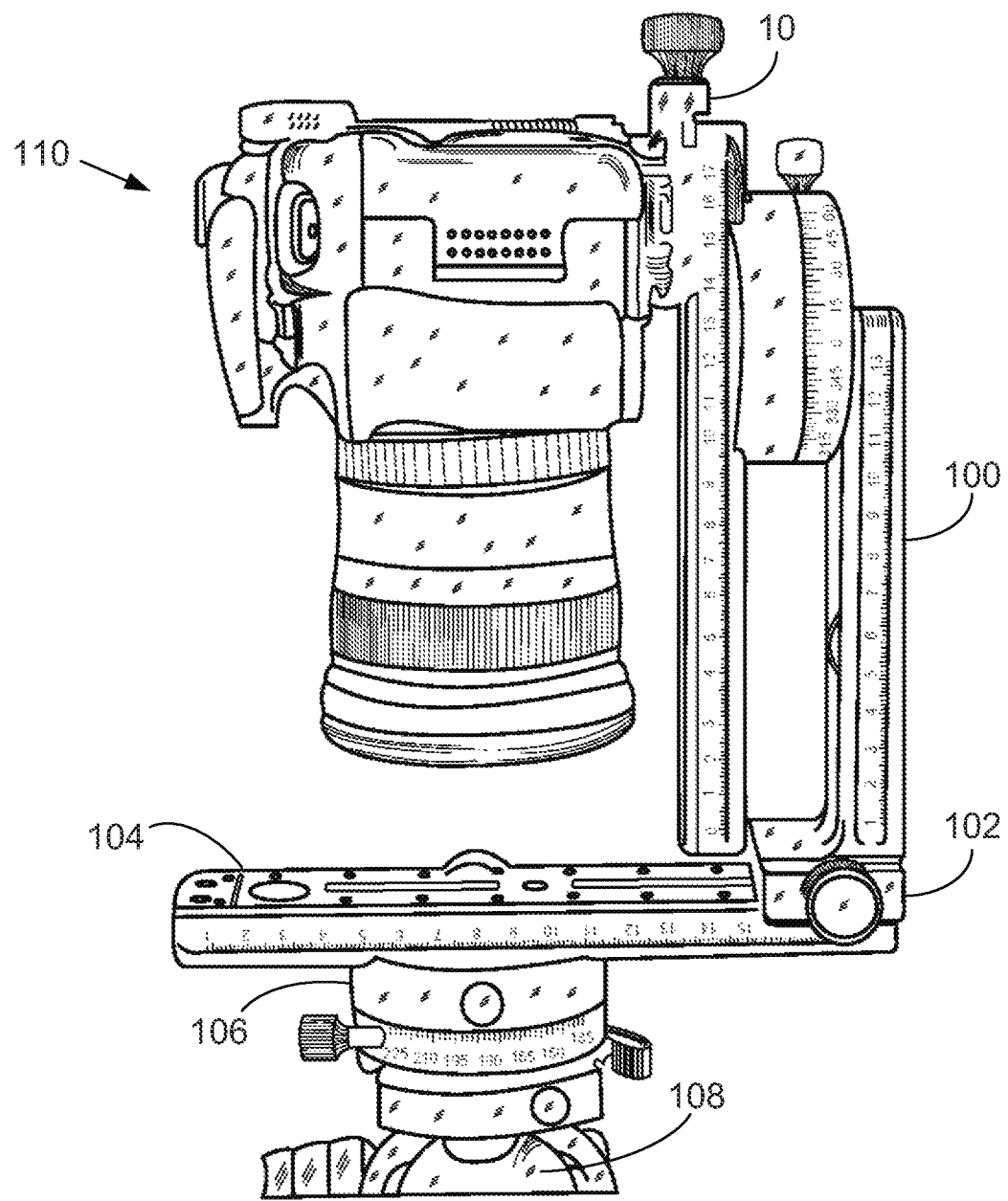
FIG. 7 illustrates a panning assembly in a first position.
Figure 8:
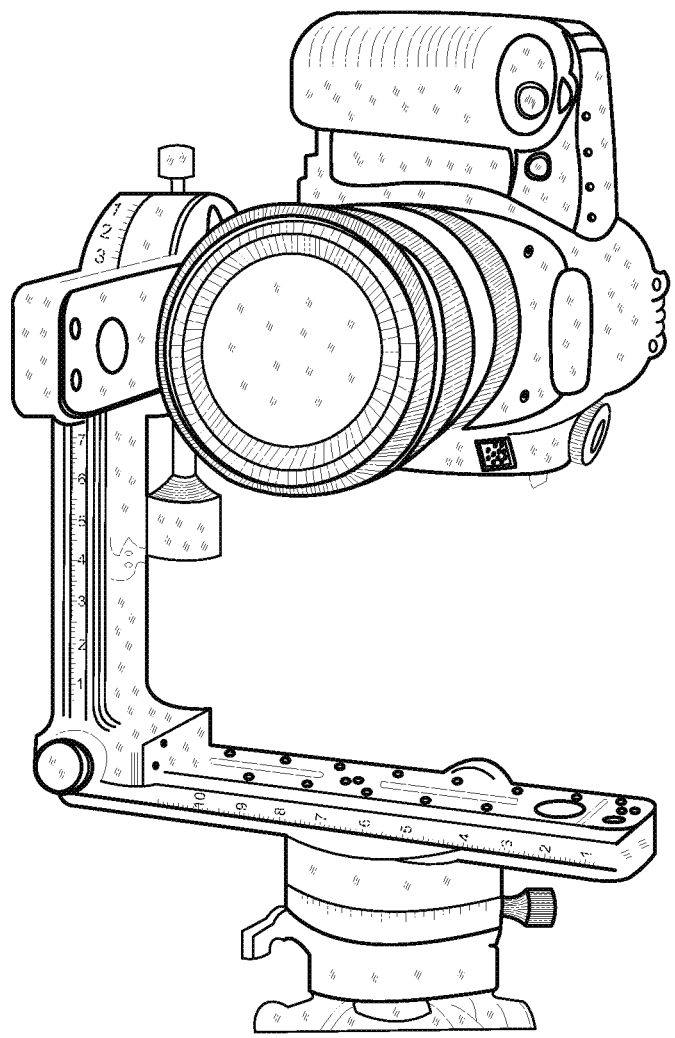
FIG. 8 illustrates a panning assembly in a second position.
Figure 9:
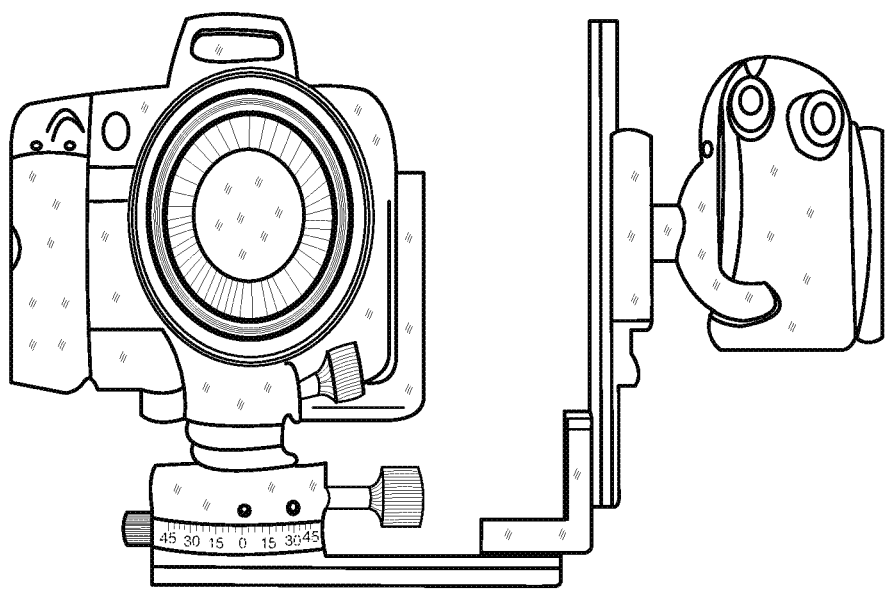
FIG. 9 illustrates a panning assembly in a third position.
Figure 10:
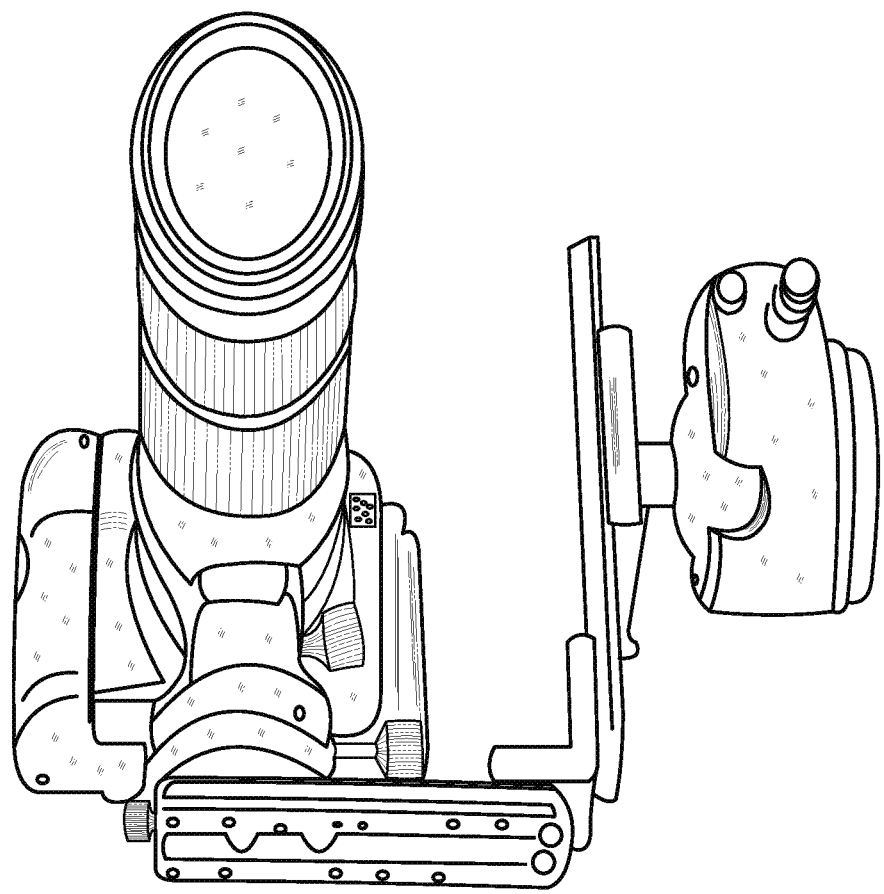
FIG. 10 illustrates a panning assembly in a fourth position.
Figure 11:
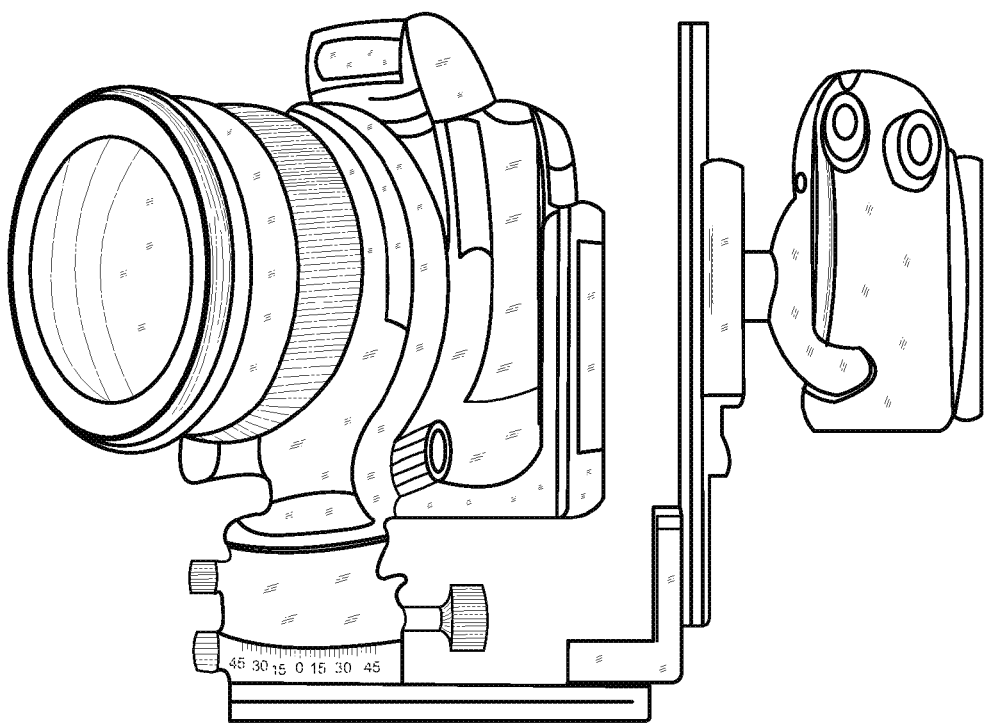
FIG. 11 illustrates a panning assembly in a fifth position.

Referring to FIG. 7, a camera 110 may be supported by the panning clamp 10. The panning clamp 10 permits selective rotational movement of the camera 110. The panning claim 10 is supported by a bracket 100. The bracket 100 is supported at a 90 degree (or substantially 90 degrees) angle with respect to a bracket 104 by an "L" shaped bracket 102. The bracket 104 is detachable engageable to a clamp 106 supported by a ball head 108. FIGS. 8, 9, 10, and 11 illustrate other orientations for the camera 110.

Figure 12:
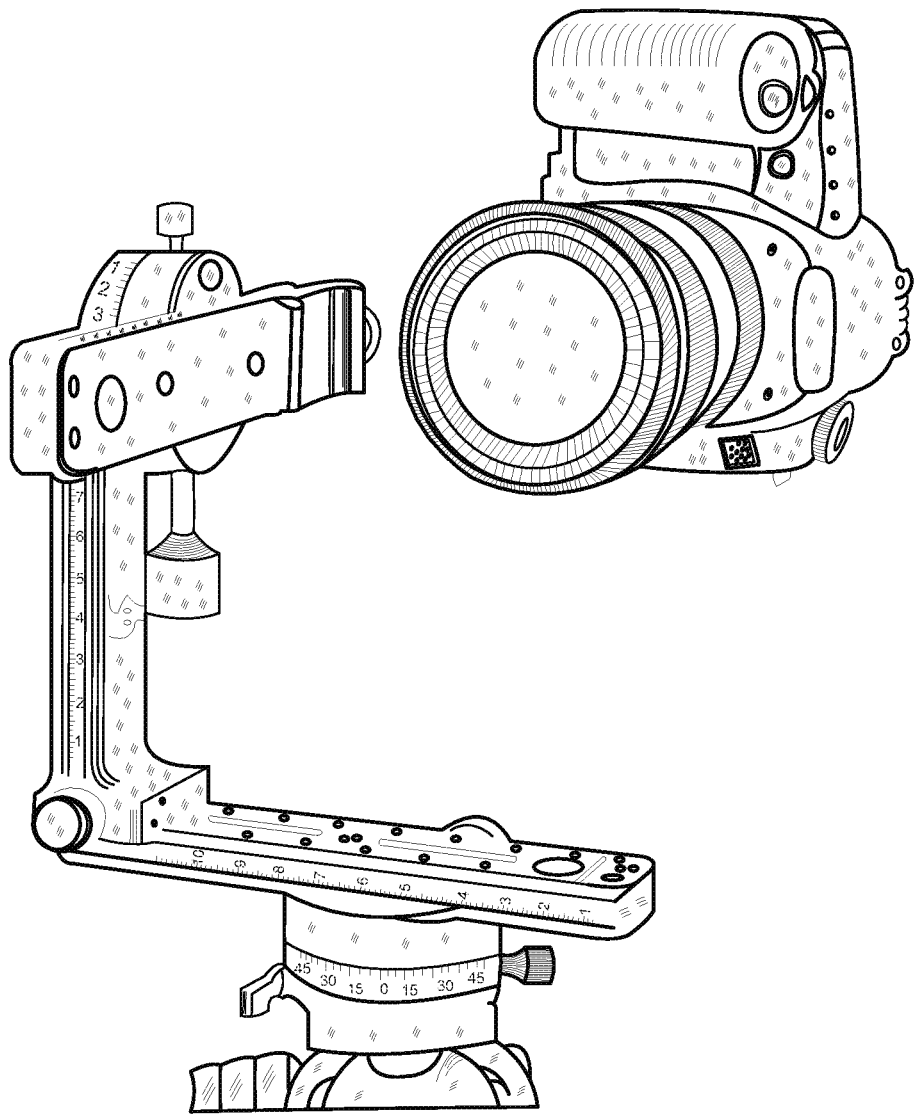
FIG. 12 illustrates a bracket.
Figure 12:
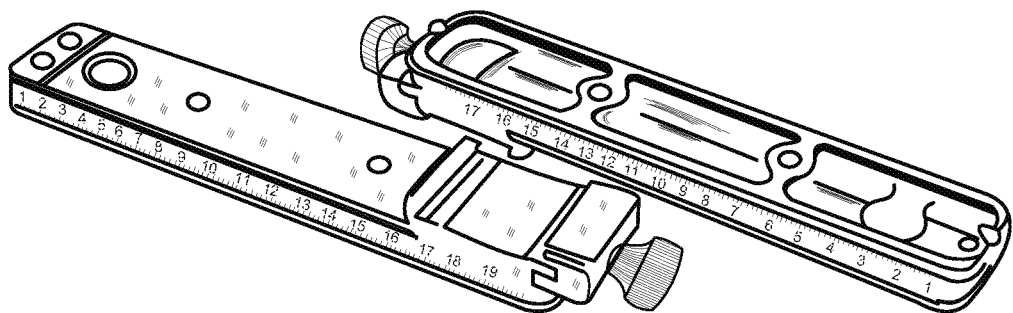
Figure 13:
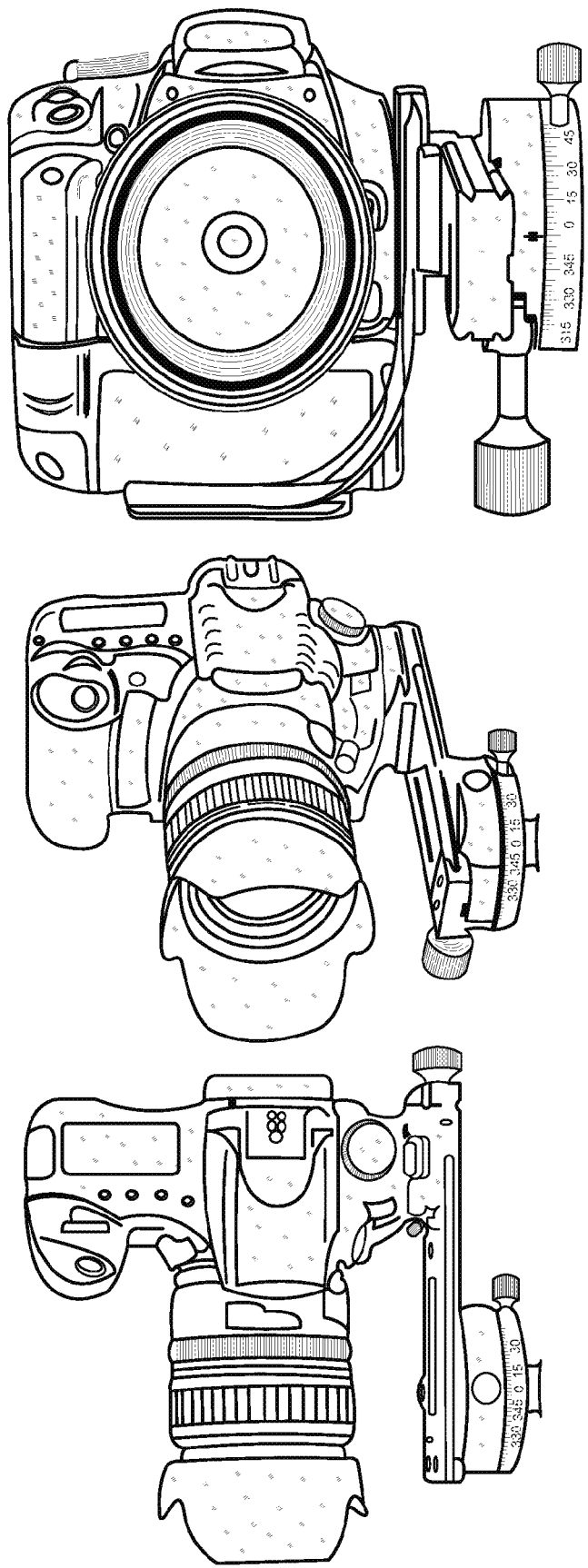
FIG. 13 illustrates a panning assembly in a sixth position.
Figure 14:
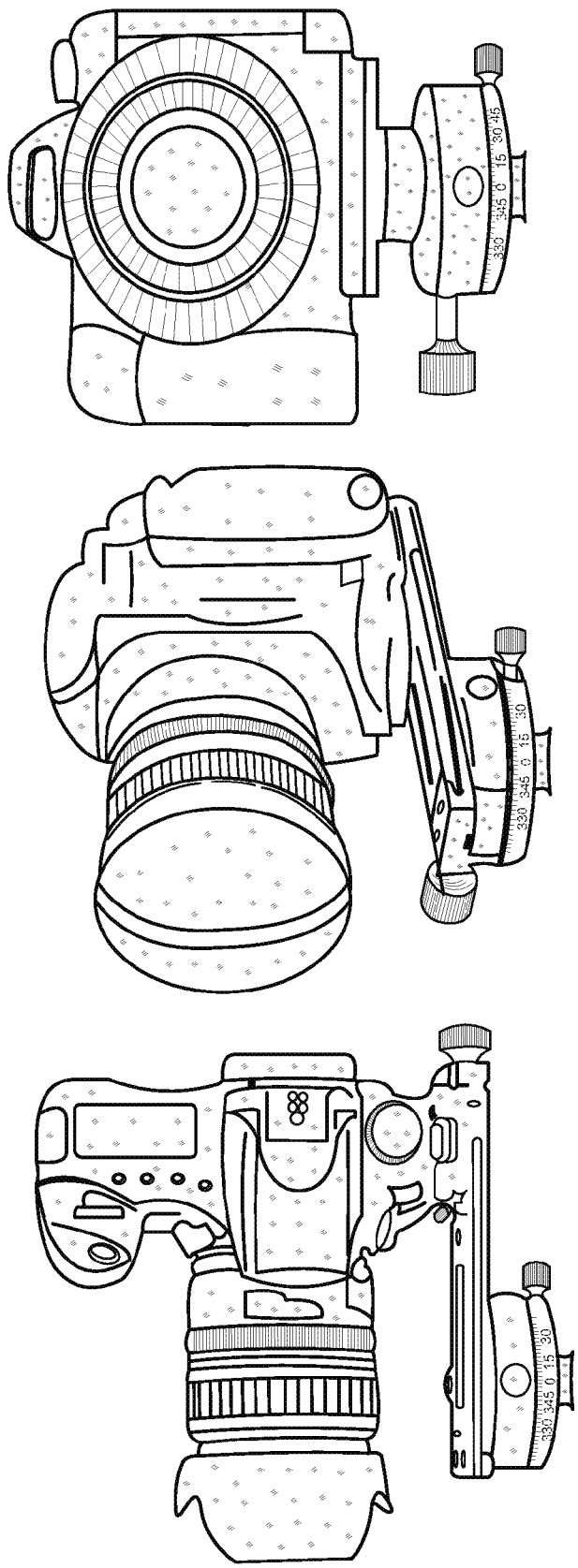
FIG. 14 illustrates a panning assembly in a seventh position.
Figure 15:
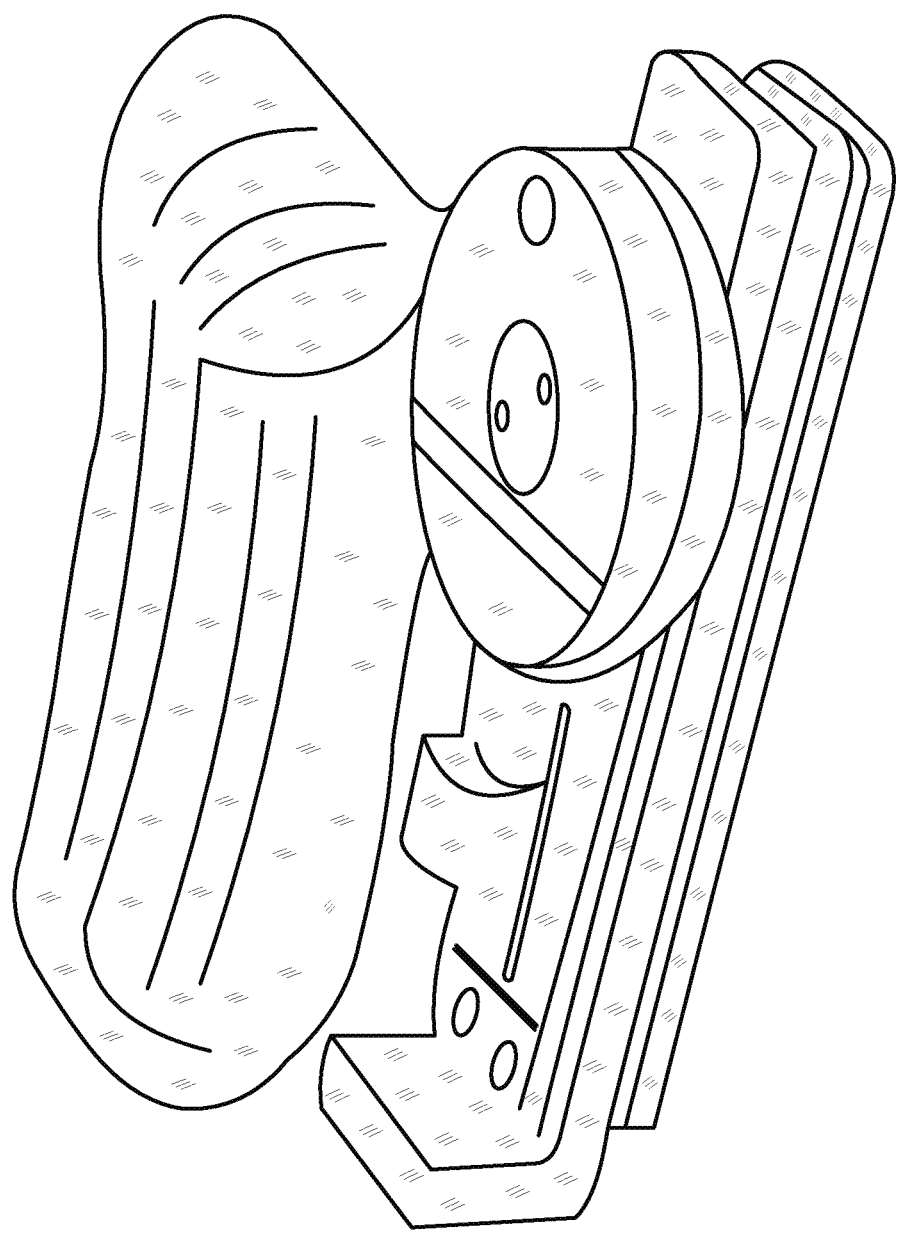
FIG. 15 illustrates a panning assembly in a disassembled arrangement.

Referring to FIG. 12, the bracket 100 may include a clamp mechanism 125 at one end thereof along with a notch 127 along both of its sides. Other types of brackets may likewise be used, as desired. Referring to FIG. 13, the camera, bracket, and panning clamp illustrate the proper positioning of the camera in a vertical position with respect to axis of rotation of the panning clamp. Referring to FIG. 14, the camera, bracket, and panning clamp illustrate the proper positioning of the camera in a horizontal position with respect to axis of rotation of the panning clamp. Referring to FIG. 15, a compact assembly may include a pair of brackets 100, 104, an "L" shaped bracket 102, and a panning clamp 10, all arranged in a stacked manner so that they are readily stored in a rectangular pouch 133.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I/we claim:

1. A panoramic device comprising:
   (a) a base having a lower surface suitable for supporting said base;
   (b) a first clamp member secured for rotation to said base and comprising a first clamp surface rotatable about a single axis substantially normal to said lower surface, said panoramic device being free from and incapable of said first clamp surface being said rotatable about an axis other than said single axis substantially normal to said lower surface;
   (c) a second clamp member comprising a second clamp surface slidably secured to said first clamp member and movable by rotation of a first screw to approach said first clamp surface to clamp an article therebetween and movable by reversing rotation of said first screw to separate from said first clamp surface to release an article clamped between said first clamp surface and said second clamp member; and
   (d) a second screw movable by rotation to selectively impede relative rotation of said first clamp member and said base, said first clamp member and said second clamp member not releasable from said base by movement of said second screw.

2. The panoramic device of claim 1 further comprising a bias mechanism that biases said second clamp member away from said first clamp surface.

3. The panoramic device of claim 2 wherein said bias mechanism includes at least one spring.

4. The panoramic device of claim 2 wherein said bias mechanism includes at least two springs.

5. The panoramic device of claim 1 wherein said first screw is in threaded engagement with said first clamp member.

6. The panoramic device of claim 5 wherein said first screw passes through a portion of said second clamp member.

7. The panoramic device of claim 6 further comprising a sleeve surrounding a portion of said first screw.

8. The panoramic device of claim 1 further comprising a knob attached to said first screw.

9. The panoramic device of claim 1 further comprising a level bubble visible at an upper surface of said panoramic device.

10. The panoramic device of claim 9 wherein said level bubble is approximately flush with the upper surface of said panoramic device.

11. The panoramic device of claim 1 wherein said second screw is in threaded engagement with said base.

12. The panoramic device of claim 11 wherein said second screw includes a knob attached thereto.

13. The panoramic device of claim 1 wherein said clamp surface includes a plurality of different elevations.

14. A panoramic device comprising:
   (a) a base having a lower first surface suitable for supporting said base;
   (b) a first clamp member secured for rotation to said base and comprising a first clamp surface rotatable about a single axis substantially normal to said lower first surface, said panoramic device being free from and incapable of said first clamp surface being said rotatable about an axis other than said single axis substantially normal to said lower surface;
   (c) a second clamp member slidably secured to said first clamp member and movable by rotation of a first screw to approach said first clamp surface and clamp an article therebetween and movable by reversing rotation of said first screw to separate from said first clamp surface to release an article clamped between said first clamp surface and said second clamp member; and
   (d) a movable member located within an outer periphery of said panoramic device to selectively impede relative rotation of said base and said first clamp member, and said movable member movable by rotation of a second screw in a first rotational direction to increasingly impede relative rotation of said first clamp member and said base, and said movable member movable by rotation of said second screw in a second rotational direction to decreasingly impede relative rotation of said first clamp member and said base.

15. The panoramic device of claim 14 further comprising a bias mechanism that biases said second clamp member away from said first clamp surface.

16. The panoramic device of claim 15 wherein said bias mechanism includes at least one spring.

17. The panoramic device of claim 16 wherein said bias mechanism includes at least two springs.

18. The panoramic device of claim 17 wherein said first screw passes through a portion of said second clamp member.

19. The panoramic device of claim 18 further comprising a sleeve surrounding a portion of said first screw.

20. The panoramic device of claim 19 further comprising a knob attached to said first screw.

21. The panoramic device of claim 14 wherein said first screw is in threaded engagement with said first clamp member.

22. The panoramic device of claim 14 further comprising a level bubble visible at an upper surface of said panoramic device.

23. The panoramic device of claim 22 wherein said level bubble is approximately flush with the upper surface of said panoramic device.

24. The panoramic device of claim 14 wherein said first clamp member and said second clamp member not releasable from said base by movement of said second screw.

25. A panoramic device comprising:
(a) a base having a lower first surface and an upper second surface;
(b) a first clamp member having an upper clamp surface and secured to said base for rotation within a single plane of rotation with respect to said upper second surface of said base, said upper clamp surface including a central region at a different elevation than another substantially parallel portion of said upper surface, said first clamp member including a first opposing surface, said panoramic device being free from and incapable of said upper clamp surface being said rotatable within a plane of rotation other than said single plane of rotation with respect to said upper second surface of said base;
(c) a second clamp member including a second opposing surface and movably engaged with said first clamp member;
(d) a first knob rotatably engaged with said first clamp member, said first knob rotatable to selectively move said second opposing surface farther from said first opposing surface and rotatable to selectively move said second opposing surface nearer said first opposing surface to secure an object between said first opposing surface and said second opposing surface; and
(e) a second knob rotatable to selectively inhibit rotation of said first clamp member with respect to said base, said first clamp member and said second clamp member not releasable from said base by movement of said second knob.

26. The panoramic device of claim 25 further including a bias mechanism that biases said second opposing surface to move further from said first opposing surface.

27. The panoramic device of claim 26 wherein said bias mechanism includes at least one spring.

28. The panoramic device of claim 26 wherein said bias mechanism includes at least two springs.

29. The panoramic device of claim 25 wherein said first knob comprises a screw in engagement with one of said first clamp member and said second clamp member.

30. The panoramic device of claim 29 wherein said screw passes through a portion of said second clamp member.

31. The panoramic device of claim 30 further comprising a sleeve surrounding a portion of said screw.

32. The panoramic device of claim 31 including a clamp knob attached to said screw.

33. The panoramic device of claim 25 further comprising a level bubble visible from a point spaced apart and substantially normal to said upper clamp surface of said first clamp member.

34. The panoramic device of claim 33 wherein said level bubble is approximately flush with the said upper surface of said first clamp member.

35. The clamp of claim 25 further including a movable member located within an outer periphery of said panoramic device to selectively impede relative rotation of said base and said first clamp member, and said movable member movable by rotation of said second knob in a first rotational direction to increasingly impede relative rotation of said first clamp member and said base, and said movable member movable by rotation of said second knob in a second rotational direction to decreasingly impede relative rotation of said first clamp member and said base.

36. A panoramic device comprising:
(a) a base member having a lower surface suitable to support said base;
(b) a clamp member having an upper surface rotatably within a single plane of rotation with said base, said panoramic device being free from and incapable of said upper surface being said rotatable with a plane different than said single plane of said rotation with said base;
(c) a first rotatable knob that selectively inhibits the rotation of said clamp member with respect to said base,
(d) said upper surface of said clamp member includes a central region that is at a different elevation than another portion of said upper surface;
(e) said clamp member including a pair of opposed surfaces suitable to detachably secure a camera thereto, wherein one of said opposed surfaces is maintained in a fixed relationship with respect to said clamp member, wherein the other one of said opposed surfaces is in a movable relationship with respect to said clamp member using a second rotatable knob;
(f) said clamp member not releasable from said base by movement of said second knob; and
(g) said clamp member includes an externally visible level bubble.

37. The clamp of claim 36 including a bias mechanism that biases said clamp in an unsecured position.

38. The clamp of claim 37 including a screw in engagement with one of said opposed surfaces.

39. The clamp of claim 38 wherein said screw passes through a portion of said clamp.

40. The clamp of claim 39 including a sleeve surrounding a portion of said screw.

41. The clamp of claim 40 including a knob attached to said screw.

42. The clamp of claim 36 wherein said bias mechanism includes at least one spring.

43. The clamp of claim 36 wherein said bias mechanism includes at least two springs.

44. The clamp of claim 36 further including a movable member located within an outer periphery of said panoramic device to selectively impede relative rotation of said base and said clamp member, and said movable member movable by rotation of said first rotatable knob in a first rotational direction to increasingly impede relative rotation of said clamp member and said base, and said movable member movable by rotation of said first rotatable knob in a second rotational direction to decreasingly impede relative rotation of said clamp member and said base.

* * * * *

UNITED STATES PATENT AND TRADEMARK OFFICE
CERTIFICATE OF CORRECTION

| | | |
|---|---|---|
| PATENT NO. | : 8,827,576 B2 | Page 1 of 1 |
| APPLICATION NO. | : 13/569055 | |
| DATED | : September 9, 2014 | |
| INVENTOR(S) | : Joseph M. Johnson | |

It is certified that error appears in the above-identified patent and that said Letters Patent is hereby corrected as shown below:

In the Specification

<u>Col. 1, Line 52</u>

After "FIG." insert --1--.

<u>Col. 3, Line 25</u>

Change "claim" to read --clamp--.

Signed and Sealed this
Twenty-fourth Day of February, 2015

Michelle K. Lee
*Deputy Director of the United States Patent and Trademark Office*